(12) United States Patent
Kuroda et al.

(10) Patent No.: US 8,795,403 B2
(45) Date of Patent: Aug. 5, 2014

(54) FILTER CLOTH FOR DUST COLLECTOR

(75) Inventors: Yukimasa Kuroda, Tokyo (JP); Yutaka Sasaki, Tokyo (JP); Yoshihiro Takagi, Nagoya (JP); Isao Kimura, Nagoya (JP)

(73) Assignees: Asahi Kasei Fibers Corporation, Osaka-Shi (JP); Asamasu Co., Ltd., Nagoya-Shi (JP)

( * ) Notice: Subject to any disclaimer, the term of this patent is extended or adjusted under 35 U.S.C. 154(b) by 151 days.

(21) Appl. No.: 13/389,751

(22) PCT Filed: Aug. 9, 2010

(86) PCT No.: PCT/JP2010/063500
§ 371 (c)(1),
(2), (4) Date: Apr. 20, 2012

(87) PCT Pub. No.: WO2011/019022
PCT Pub. Date: Feb. 17, 2011

(65) Prior Publication Data
US 2012/0216496 A1    Aug. 30, 2012

(30) Foreign Application Priority Data

Aug. 10, 2009 (JP) ................................ 2009-185599

(51) Int. Cl.
*B01D 46/00* (2006.01)
(52) U.S. Cl.
USPC .............. 55/486; 210/489; 210/508; 210/797
(58) Field of Classification Search
USPC .............................. 55/486; 210/489, 508, 797
See application file for complete search history.

(56) References Cited

U.S. PATENT DOCUMENTS

2005/0045566 A1* 3/2005 Larkin et al. .................. 210/767
2008/0302072 A1* 12/2008 Hassmann et al. .............. 55/486

FOREIGN PATENT DOCUMENTS

| CN | 201135839 | 10/2008 |
|---|---|---|
| EP | 1 514 586 A1 | 3/2005 |
| JP | 55-99315 | 7/1980 |
| JP | 62144723 | 6/1987 |
| JP | 5-220312 | 8/1993 |
| JP | 7-88312 | 4/1995 |
| JP | 2005-171415 | 6/2005 |
| JP | 2008161803 | 7/2008 |

OTHER PUBLICATIONS

European Patent Office Communication with the extended European Search Report, application No. EP 10 80 8205, 6 pages, May 7, 2013.

(Continued)

Primary Examiner — Jason M Greene
Assistant Examiner — Karla Hawkins
(74) Attorney, Agent, or Firm — Finnegan, Henderson, Farabow, Garrett & Dunner, L.L.P.

(57) ABSTRACT

The present invention provides a filter cloth for a dust collector which shows low pressure loss, no clogging, superior dust shaking-off performance, and durability for continuous use without impairing collection performance, even under such dust collection conditions as high speed filtration and high dust concentration. The filter cloth for a dust collector relevant to the present invention is a filter cloth which is made by laminating and integrating a filtration layer of a nonwoven fabric layer consisting of a thermoplastic fiber and a support layer consisting of a woven fabric layer, characterized in that at least filtration surface layer of said laminated and integrated filter cloth has a concave-convex shape having a height from hill part to trough part of 1.6 to 20.0 mm.

10 Claims, 5 Drawing Sheets

(56) References Cited

OTHER PUBLICATIONS

English-language International Search Report from the Japanese Patent Office mailed Oct. 19, 2010, for International Application No. PCT/JP2010/063500.

Office Action for CN Application No. 201060035541.8 dated Sep. 12, 2013.
Office Action for JP Application No. 2011-526756 dated Oct. 22, 2013.

* cited by examiner

FILTER CLOTH FOR DUST COLLECTOR

TECHNICAL FIELD

The present invention relates to a filter cloth for a dust collector. In more detail, the present invention relates to a filter cloth for a dust collector which exerts superior filtration performance even under severe use conditions such as high dust concentration and high speed filtration.

BACKGROUND ART

Generally, a dust collector repeats such actions as making a primary deposit of powder to be collected on the surface layer of a planar filter cloth which is sewn in tubular or envelope shape to form a powder layer which prevents the powder from intruding inward and collect the powder on the primary powder layer; and then removing the collected powder by pulsating main body of the filter cloth by reversing inside/outside pressures of the filter cloth or like. Therefore, performance of the dust collector is controlled by how properly a balance of collection and removal is maintained.

For this reason, these filter cloths are desired to show low pressure loss (hereinafter, referred to as low pressure loss), high collection efficiency, no clogging, and superior dust shaking-off performance, and until now, various types of filter cloths have been proposed. For example, it is described that a method where a fiber layer on the surface of filter cloth is made to a dense structure or a laminated structure of fine fibers on the surface of filter cloth (see Patent Documents 1 to 3 below), and a method where a film such as mainly PTFE resin or a porous film is arranged on the surface layer (surface) (see Patent Document 4 below) are highly effective for the above requirements. However, depending on properties of the powder to be target, since airflow resistance is increased because the adherent layer of the powder forms a too dense structure, or the like, it cannot be necessarily said to be superior in functions thereof.

In addition, in order to obtain high speed filtration and low pressure loss of a dust collecting equipment, a means to increase filtration area of a filter cloth has been also employed. For example, a method such as pleating has been known (see Patent Documents 5 and 6 below). However, since collected dust deposits significantly in a trough part of pleats, the filter cloth as a whole does not have a function as an effective filtration area, and it cannot be said that this method increase filtration area in a form which is durable for a continuous use in the bag filter use. In addition, the following Patent Document 7 describes that superior air permeability can be obtained by a concave-convex sheet made of a nonwoven fabric having a concave-convex shape, but application to bag filter use was not successful due to insufficient strength.

PRIOR ART REFERENCES

Patent Documents

Patent Document 1: JP No. 3722259
Patent Document 2: JP-B-7-96089
Patent Document 3: JP-A-9-187611
Patent Document 4: JP No. 3793130
Patent Document 5: JP No. 4110628
Patent Document 6: JP No. 4023042
Patent Document 7: JP-A-2001-48238

SUMMARY OF INVENTION

Problem to be Solved by the Invention

A problem to be solved by the present invention is to provide a filter cloth for a dust collector which shows low pressure loss, no clogging, superior dust shaking-off performance, and durability for continuous use, without impairing collection performance even under such dust collection conditions as high speed filtration and high dust concentration. Furthermore, another problem to be solved by the present invention is to provide a filter cloth for a dust collector which has filter performances showing no dust clogging, superior dust shaking-off performance, low pressure loss, and long life, without limiting a size of a dust collector where the bag filter is used.

Means for Solving the Problem

The present inventors have intensively studied and repeated experiments to solve the above-described problems, as a result, have found that the above-described problems can be solved by depositing the target powder on a filter cloth furnished a concave-convex shape on at least filtration surface layer of a laminate, which is made by laminating and integrating a filtration layer of a nonwoven fabric layer consisting of a thermoplastic fiber and a support layer of a woven fabric layer, and completed the present invention.

That is, the present invention is as follows.

[1] A filter cloth for dust collection made by laminating and integrating a filtration layer of a nonwoven fabric layer consisting of a thermoplastic fiber and a support layer of a woven fabric layer, characterized in that at least filtration surface layer of said laminated and integrated filter cloth has a concave-convex shape having a height from hill part to trough part of 1.6 to 20.0 mm.

[2] The filter cloth for dust collection according to the aforementioned item [1], wherein the number per unit area of any one of concave part, convex part and concave-convex part is 10 to 5000/100 $cm^2$.

[3] The filter cloth for a dust collector according to the aforementioned item [1] or [2], wherein the filtration surface layer has concave-convex shapes having different density.

[4] The filter cloth for a dust collector according to any one of the aforementioned items [1] to [3], wherein a fused portion by melting and a non-fused portion are intermingled on the filtration surface layer.

[5] The filter cloth for a dust collector according to any one of the aforementioned items [1] to [4], wherein the filter cloth has been provided with a resin binder.

[6] The filter cloth for a dust collector according to any one of the aforementioned items [1] to [5], wherein the filter cloth has an air permeability of 1 to 100 $cc/cm^2/sec$.

[7] The filter cloth for a dust collector according to any one of the aforementioned items [1] to [6], wherein the filtration layer of the nonwoven fabric layer consists of any one of staple fiber nonwoven fabric, filament nonwoven fabric or fiber web which has a fiber diameter of 0.1 to 100 μm and a weight of 100 to 900 $g/m^2$.

[8] The filter cloth for a dust collector according to any one of the aforementioned items [1] to [7], wherein the support layer of the woven fabric layer is a woven fabric consisting of any one of multifilament, monofilament or spun yarn.

[9] The filter cloth for a dust collector according to any one of the aforementioned items [1] to [8], wherein the thermoplastic fiber of the filtration layer is made by laminating or blending a polyester fiber having a birefringence of 0.06 or less.

[10] The filter cloth for a dust collector according to any one of the aforementioned items [1] to [8], wherein the thermoplastic fiber of the filtration layer is made by laminating or blending a polyphenylene sulfide fiber having a birefringence of 0.08 or less.

Effect of the Invention

The filter cloth for a dust collector relevant to the present invention has filtration performances showing minimal dust clogging, superior powder removal performance, low pressure loss, and long life, without impairing collection performance even under such dust collection conditions as high speed filtration and high dust concentration, and therefore does not limit the size of a dust collector where a bag filter is used and can be used widely for various types of dust collectors. The dust collector where a bag filter is used has superior collection efficiency for microparticles, meanwhile there is a demerit that it is a higher power consumption type compared with other types of machines (electric dust collector, cyclone, and the like), having a greater pressure loss. However, by using the filter cloth for a dust collector of the present invention, reduction in pressure loss and energy saving can be expected.

EMBODIMENTS FOR CARRYING OUT THE INVENTION

Figure 1:
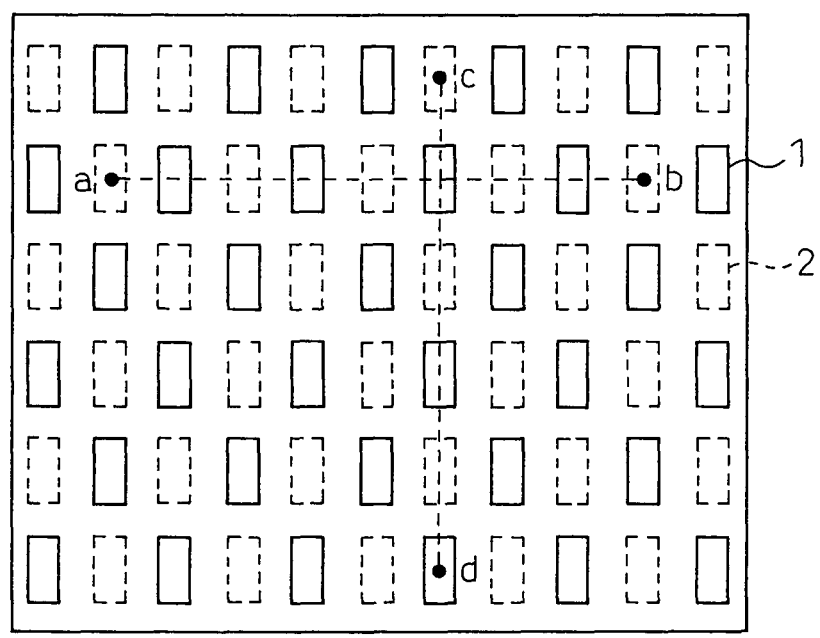
FIG. 1 is a planar schematic diagram (concave-convex type: rectangle shape) of the surface of the filter cloth.

Hereinafter, the present invention will be explained in detail.

The present invention is a filter cloth for a dust collector made by laminating and integrating a filtration layer of a nonwoven fabric layer consisting of a thermoplastic fiber and a support layer consisting of a woven fabric layer, characterized in that at least filtration surface layer of said laminated and integrated laminate has a concave-convex shape having a height from hill part to trough part of 1.6 to 20.0 mm. Due to such configuration, the filter cloth of the present invention functions as a filter cloth for a dust collector which has filter performances showing no dust clogging, superior powder removal performance, low pressure loss, and long life.

In the filter cloth of the present invention, a role of the concave-convex shape having a height difference of 1.6 mm or more on the surface layer of the filter cloth is to increase filtration area and improve performance of the filter cloth by making the surface of the filter cloth in a concave-convex shape by utilizing formativeness of a thermoplastic fiber, for example, to provide low pressure loss, high speed filtration, and high collection performance. Increase of filtration area, that is, surface area ratio (area after concave-convex processing/area before concave-convex processing) between before and after the concave-convex processing is preferably 1.1 to 4.0, and more preferably 1.1 to 3.2.

In the filter cloth of the present invention, at least the filtration surface layer of a laminated and integrated laminate preferably has a concave-convex shape having difference in density. Due to this concave-convex shape, large variation is generated in an approach angle of dust and the tightness of dust layer is formed loosely. In addition, by providing difference in density between the shaped concave surface and the convex surface, the powder collected by dust collection forms a thick deposit layer in the concave part and a thin deposit layer in the convex part. For this reason, in particular, when dust is shook off by pulse jet system, the deposit layers become easy to crumble, and hence dust shaking-off effect is heightened. Furthermore, difference in airflow resistance generated by differences in each fiber density of bottom face of the concave part, top of the convex part, and side wall of the convex part connecting them heightens the effect to form a deposit layer without compacting the powder collected on the filter cloth. By these effects, the filter cloth can maintain less clogging, more reduced airflow resistance, lower pressure loss of the whole filter cloth compared with a filter cloth having a smooth surface.

Further, in the preceding step where concave-convex processing is carried out, the filtration surface layer is modified to a form where a fused part by melting and a non-fused part are present together by means of singeing, indirect heating by heating roller or infrared heater, or the like, to suppress clogging and improve dust shaking-off performance of the filter cloth. A range of the melted fused part in the filtration area layer may be 3 to 80%, and preferably 10 to 60%. When the fused part is less than 3%, dust shaking-off performance is lowered, while when the fused part exceeds 80%, dust shaking-off effect is superior but pressure loss becomes great.

Figure 2:
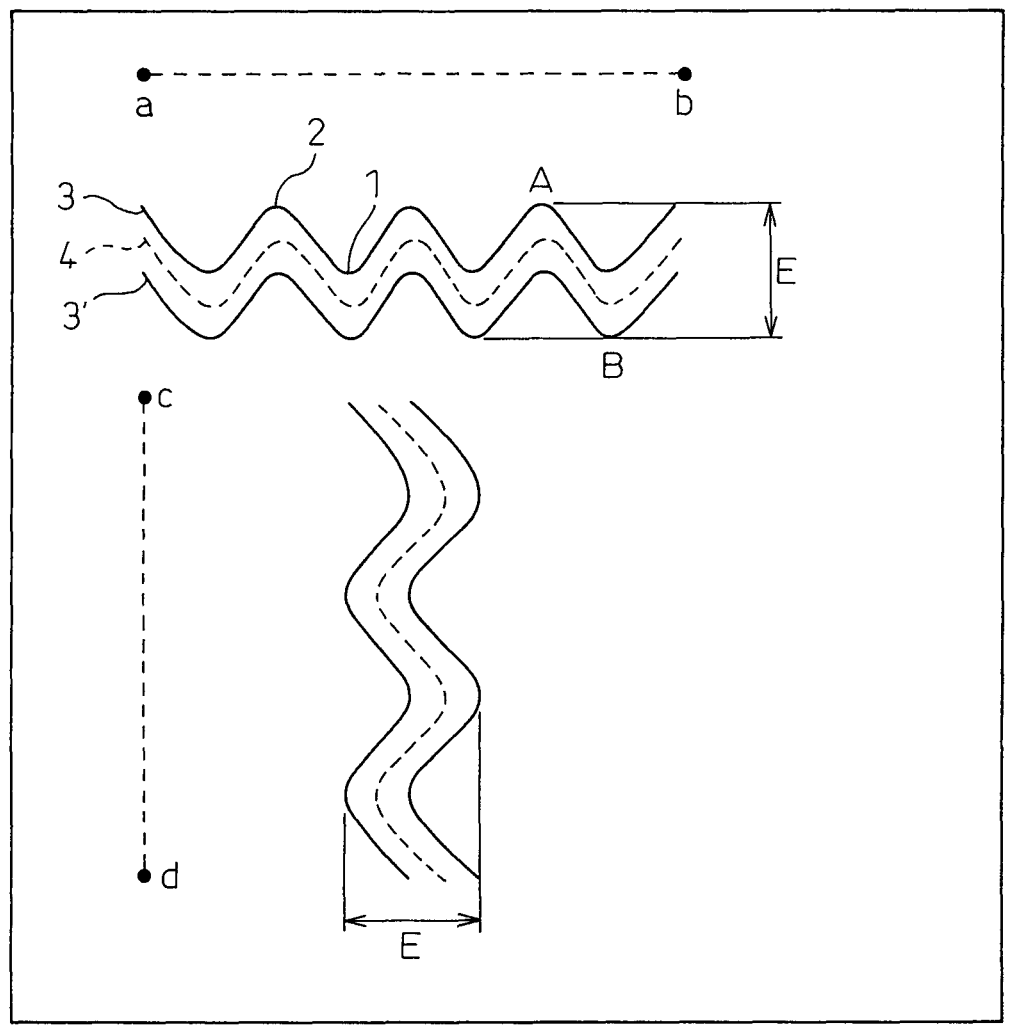
FIG. 2 is a cross-sectional schematic diagram (between a to b and c to d in FIG. 1) of the filter cloth.

In the present invention, the height (hereinafter, also referred to as height of concave-convex part) from a hill part of the convex part to a trough part of the concave part means a height difference E from the highest point A in the surface represented by 3 (filtration layer face) in FIG. 2 to the lowest point B in FIG. 2, in a laminate shaped by a concave-convex roller.

In the present invention, it is necessary that the height from hill part to trough part in the concave-convex part is within a range of 1.6 to 20.0 mm. That is, when the height from hill part to trough part in the concave-convex part is less than 1.6 mm, filtering function for the powder is similar to that of a filter cloth having a smooth surface and the effect of dust shaking-off performance is poor. On the other hand, when the height from hill part to trough part in the concave-convex part exceeds 20.0 mm, a problem such as early deterioration, for example, occurrence of a hole occurs because of poor abrasion resistance due to contact with a retainer, or workability in sewing into a cylindrical shape is impaired. Therefore, the height from hill part to trough part in the concave-convex part is preferably 2.0 to 16.0 mm, and more preferably 2.0 to 12.0 mm.

In this regard, however, when laminating and integrating are implemented by needle-punching, a concave-convex shape generated on the filtration surface layer caused by alignment pattern of the needles is not included in the concave-convex shape of the present invention.

In addition, a filter having a shape of so-called pleats type is preferably not included.

The concave-convex shape of the filtration surface layer of the present invention means a cross-sectional shape made by shaping processing in a concave-convex shape using a concave-convex shaping equipment using a pair of concave-convex rollers (see JP No. 3939985); an embossing equipment such as a pair of metal engraved rollers, a combination of a metal engraved roller for one face and a paper roller for another face; a flat press equipment using a metal engraved plate; a cylinder type press equipment; and the like. FIG. 2 shows a typical wave type. Besides this, there are continuous arrangements of gear type, lattice type, or the like, or discontinuous staggered arrangement, or regular interval arrangements of a concave part of semi-spherical or polygonal shape, or the like. The aforementioned concave-convex shape is not particularly limited, and it is preferable to increase the surface area of a filter cloth compared with a planar surface. Further, a shape to be shaped on the surface of a filter cloth includes, besides a rectangular shape shown in FIG. 1, square-shaped, circular, oval, diamond-shaped, and the like, but is not limited thereto.

In the present invention, the number of any one of concave part, convex part and concave-convex part per unit area is 10 to 5000 pieces/100 $cm^2$, and more preferably 50 to 1500 pieces/$cm^2$.

Figure 3:
FIG. 3 is an electron micrograph as an alternative to a drawing showing a state of a dense part of the surface of the filter cloth.
Figure 4:
FIG. 4 is an electron micrograph as an alternative to a drawing showing a state of a course part of the surface of the filter cloth.

Next, an example of state photograph of the surface of the filter cloth of the present invention is shown in FIG. 3. FIG. 3 is a state photograph observed and taken by an electron microscope of portion 1 in the planar and cross-sectional schematic diagrams of the surface of a filter cloth shown in FIGS. 1 and 2, and FIG. 4 is a state photograph observed and taken by an electron microscope of portion 2 in the same figures. In these figures, 5 shows a fused part where filtration surface layer is melted by a heating roller in the preceding step to carry out the concave-convex processing, 6 shows a dense part where fibers in the surface layer of a laminate are crushed and tightly adhered each other directly by a concave-convex roller, and 7 shows a course part where fibers on the surface layer of a laminate are pushed up and stretched by a concave-convex roller, and gap between fibers is widened. As obvious from FIGS. 3 and 4, a fused part by melting, a dense part by crushing, and a course part by extension are present together on the surface layer of the filter cloth. It can be confirmed by these observations by electron microscope that the filtration surface layer has at least a concave-convex shape having different densities, and a fused part by melting and a non-fused part are present together. In addition, it is preferable that the fused part exists more densely in the concave part, because clogging of dust into the inside in the concave part is inhibited.

The thermoplastic fiber to be used in the present invention is preferably synthetic fiber and regenerated fiber, and most preferably thermoplastic synthetic filament. As a raw resin for the thermoplastic synthetic filament, a synthetic resin which can be converted to a fiber is used. It includes, for example, polyolefin type such as polyolefin such as polypropylene, ethylene-propylene copolymer, ethylene-vinyl acetate copolymer; polyester type such as aromatic polyester copolymer such as polyethylene terephthalate, polybutylene terephthalate, polytrimethylene terephthalate, aromatic polyester copolymer in which one or more compounds of phthalic acid, isophthalic acid, sebacic acid, adipic acid, diethylene glycol, and 1,4-butanediol are copolymerized with polyethylene terephthalate; polyester type such as aliphatic ester such as polylactic acid type polymer, poly-D-lactic acid, poly-L-lactic acid, copolymer of D-lactic acid and L-lactic acid, copolymer of D-lactic acid and hydroxycarboxylic acid, copolymer of L-lactic acid and hydroxycarboxylic acid, and copolymer of D-lactic acid and L-lactic acid and hydroxycarboxylic acid; polyamide type such as nylon 6, nylon 66, polyamide copolymer; composite type comprising a sheath of polyethylene, polypropylene or copolymer ester and a core of polypropylene, polyethylene terephthalate; polyphenylene sulfide; meta-type aramid; polytetrafluoroethylene; polyimide; acryl; polyoxymethylene; polyether ether ketone; liquid crystal polymer; polymethylpentene; polyvinyl alcohol; polyvinylidene chloride; and the like.

These thermoplastic resins may be used alone or as a polymer alloy by combining two or more kinds. In addition, two components fiber such as core-sheath structure or side-by-side structure in which two or more different resins are combined may be used.

For a filter cloth for general-purpose bag filter, polyester type polymer having superior dimensional stability is preferably used, and for a filter cloth for heat-resistant bag filter, polyphenylene sulfide, meta-type aramid, polyimide and polytetrafluoroethylene which are superior in heat resistance due to high melting point and superior also in stiffness are preferably used.

It should be noted that crystal nucleating agent, delusterant, pigment, fungicide, antibacterial agent, flame retardant, water repellent agent, and the like may be added to the aforementioned synthetic fiber within a range where the effect of the present invention is not impaired.

Cross-sectional shape of the aforementioned thermoplastic fiber is not particularly limited, but preferably has a form of round, hollow circular, oval, flat, modified type such as X-shaped, Y-shaped, polygonal type, multifoil type, and the like.

The nonwoven fabric layer as a filtration layer to be used for the filter cloth of the present invention means a nonwoven fabric or a fiber web made of staple fiber or filament, which can be obtained using the above-described thermoplastic resin as a raw material by a known method such as carding method, spun-bonding method, air-laid method, thermal bonding method, melt-blown method, and the like. Constitution of the filtration layer includes a combination of a single filament yarn fabric and a mixed filament yarn fabric.

Constitution of the filter cloth of the present invention includes a laminate of the aforementioned nonwoven fabric layer and the aforementioned support layer as a basic structure. More specifically, the constitution includes a three-layer structure comprising the aforementioned nonwoven fabric layers as the top and the bottom layers and the support layer as an interlayer, or a two-layer structure comprising the aforementioned nonwoven fabric layer in the upper part and the support layer in the lower part.

Further, diameter of the fiber to be used for the nonwoven fabric layer is preferably 0.1 to 100 μm, and more preferably 1 to 50 μm, and appropriately selected depending on kind of the powder dust (dust) to be collected. The nonwoven fabric layer of the filtration layer has a weight of preferably 100 to 900 g/$m^2$, and more preferably 200 to 700 g/$m^2$.

Further, in order to improve the concave-convex formativeness for the filtration layer, a nonwoven fabric layer consisting of a polyester fiber having a birefringence of preferably 0.06 or less, more preferably 0.003 to 0.05, and further more preferably 0.03 to 0.05 is used. When birefringence is in this range, elongation of the fiber is great and a filter cloth having good formativeness and superior shape-retaining ability for concave-convex shape can be obtained. Further, said nonwoven fabric may be used by compounding with other material by blending, laminating, or the like, and combination or kind thereof is not particularly limited.

In addition, for a filter cloth to be used in a dust collector for high-temperature gas filtration, a nonwoven fabric layer consisting of polyphenylene sulfide fiber having a birefringence of preferably 0.08 or less, and more preferably 0.03 to 0.06 is used. When birefringence is in this range, elongation of the fiber is great and a filter cloth having good formativeness and superior shape-retaining ability for concave-convex shape can be obtained. And in the practical use, the initial concave-convex shape can be retained even after exposure to a high temperature gas for a long period of time, and superior collection performance and dust shaking-off performance can be maintained for a long period of time.

Further, for the purpose to improve heat resistance of the surface layer, a combination of lamination, compounding, and the like can be employed, for example, by constituting the surface layer with a more heat-resistant fiber and the subsequent layer with a less heat-resistant fiber than the surface layer, or the like.

The support layer of woven fabric to be used for the filter cloth of the present invention is used for the purposes of reinforcement in strength and improvement in dimensional stability such as prevention of elongation of the filter cloth, and the like. Therefore, as a raw material, a woven fabric consisting of multifilament, monofilament or spun yarn of the thermoplastic resin to be used for the aforementioned nonwoven fabric may be used. Weight may be decided in such way that air permeability of the filter cloth is not impaired and strength poverty as a filter cloth does not occur, and is preferably 50 to 250 g/m$^2$, and more preferably 60 to 200 g/m$^2$.

A method for laminating and integrating the filtration layer and the support layer of the present invention is not particularly limited, but, for example, needle punching method or water punching method is preferable. Besides these methods, compounding by laminating by heating or adhesive binder may be employed, so long as strength and filtration characteristics of the filter cloth are not impaired.

Temperature of the concave-convex roller which is a condition of the shaping method for the concave-convex shape of the present invention is preferably a temperature in a range from the glass-transition point (Tg) to a temperature lower by 50 to 60° C. than the melting point of the fiber of the nonwoven fabric as the surface layer of the filter cloth.

Further, when shape-retaining ability for the concave-convex shape is insufficient, a thermoplastic and a thermosetting resin binders represented by acrylic resin type, polyurethane resin type, vinyl acetate resin type, ethylene-vinyl acetate resin type, polyvinyl alcohol type, various kinds of rubber latex and phenol resin type and epoxy resin type can be resin-impregnated or sprayed at least to the fiber of the surface layer of the laminate, before or after the concave-convex processing. Amount of the resin to be added may be a level where filtration performance is not impaired, and preferably 0.5 to 10% of a weight of the filter cloth.

Further, pigment, fungicide, antibacterial agent, flame retardant, water repellent agent, oil release agent, chemical resistance-improving resin, and the like may be added to the above-described resin, or added in a separate processing step within a range where the effect of the present invention is not impaired, to furnish a function of each agent.

Air permeability of the filter cloth of the present invention is preferably 1 to 100 cc/cm$^2$/sec, more preferably 5 to 80 cc/cm$^2$/sec, and further more preferably 10 to 50 cc/cm$^2$/sec. The air permeability less than 1 cc/cm$^2$/sec is not preferable because initial pressure loss of the filter cloth becomes high.

On the other hand, the air permeability exceeding 100 cc/cm$^2$/sec is also not preferable, because collection performance is reduced, intrusion of powder into the filter cloth increases, pressure loss rises rapidly, and clogging occurs.

Thickness of the filter cloth having concave-convex shape after the concave-convex processing of the present invention (hereinafter, simply referred to as "thickness of the filter cloth") is preferably 0.5 to 8.0 mm, and more preferably 1.5 to 6.0 mm. In addition, thickness of the filter cloth before the concave-convex processing is preferably 1.0 to 9.0 mm, and more preferably 1.0 to 8.0 mm.

Next, a preferable embodiment of a sequence of production steps for a three-layers laminated and integrated filter cloth having a concave-convex shape of the present invention will be explained.

In the first step, a back face layer of a staple fiber web obtained from staple fiber consisting of a thermoplastic fiber by a known carding method (carding conditions commonly used), an interlayer as a support layer of a woven fabric consisting of any one of multifilament, monofilament and spun yarn consisting of the same thermoplastic fiber, and a surface layer of a filament nonwoven fabric consisting of the same thermoplastic fiber and having superior concave-convex formativeness obtained by a known spun-bonding method are laminated, and the laminate is then subjected to a pre-punching from the surface layer to the back face layer by a known needle-punching method (needle-punching conditions commonly used) and a real-punching from the back face layer to the surface layer as well as from the surface layer to the back face layer, to obtain a three-layer laminate.

In the second and third steps, a singeing processing on the surface layer side and a calendaring processing by a pair of plain metal rollers (heated, with a gap) are carried out.

Subsequently, in the fourth step, a concave-convex shaping is carried out by a concave-convex shaping equipment using a pair of wave-shaping rollers at a temperature of the upper and lower rollers lower by a range of 5 to 60° C. than the melting point of the thermoplastic fiber, to obtain a three-layer laminated and integrated filter cloth.

In addition, after carrying out the concave-convex shaping in the fourth step, stiffness of the fiber can be enhanced by cooling.

EXAMPLES

Hereinafter, the present invention is explained by means of Examples and Comparative Examples. However, the present invention is not limited by no means by these Examples.

It should be noted that measurement methods and evaluation methods were as follows.
(1) Height from Hill Part to Trough Part (mm) (or Height of Concave-Convex (mm))

From the filter cloth having a concave-convex shape (1 m$^2$), a part was randomly cut out, a cross-section thereof was observed by a microscope, and a height from hill part to trough part of the concave-convex shape was measured. An average value of 10 places was calculated.
(2) Number of Any of Concave Part, Convex Part and Concave-Convex Part per Unit Area (Piece/100 cm$^2$)

Test pieces of 10 cm (length)×10 cm (breadth) were collected at 3 positions per 1 m of sample width, the number of any of concave part, convex part and concave-convex part was measured, and an average value thereof was calculated.
(3) Air Permeability (cc/cm$^2$/sec)

According to the rule of JIS-L1906, test pieces of 15 cm (length)×15 cm (breadth) were collected at 3 positions per 1 m of sample width, an amount of air passing through the test piece was measured by the Frajour type method, and an average value thereof was calculated.

(4) Weight per Unit Area (g/m²)

According to the rule of JIS-L1906, test pieces of 20 cm (length)×25 cm (breadth) were collected at 3 positions per 1 m of sample width, a mass thereof was measured and an average value thereof converted to mass per unit area was calculated.

(5) Thickness (mm)

Similar to the measurement of a height from hill part to trough part in the aforementioned item (1), a cross-section was observed by a microscope, thicknesses at the convex part were measured at 10 positions, and an average value thereof was calculated.

(6) Fiber Diameter (μm)

Test pieces were collected by cutting out a test piece of 1 cm square each from each zone having 20 cm width of a filter cloth, to make a sample. For each test piece, diameters of a fiber were measured by a microscope at 30 positions, and an average value thereof was calculated to obtain a fiber diameter.

(7) Birefringence

Using a polarizing microscope equipped with a Berek compensator (manufactured by Olympus Corp.), birefringence of a fiber was measured from retardation and fiber diameter. As a dipping liquid, an olive oil for polyester fiber and tricresyl phosphate for polyphenylene sulfide fiber were used. Measurement was carried out for 10 fibers for each sample, and an average value of 10 data was calculated.

(8) Difficulty in Clogging and Dust Shaking-Off Performance

Filtration performance was evaluated according to JIS-Z8909-1. Difficulty in clogging and dust shaking-off performance were judged from the measurement results under the following measurement conditions.

(Measurement Conditions)

Filtration speed: 2.0 mm/min;
Dust concentration: 5 g/m³;
Kind of dust: 10 kinds of test powders (fly ash);
Removal of dust: 1000 Pa;
Aging interval: 5 s;
Tank pressure: 0.5 MPa.

(9) Thickness of Filter Cloth Before Concave-Convex Processing

According to the rule of JIS-L1906, thicknesses were measured under a contact pressure load of 2 kPa at 10 positions along the breadth direction, and an average value thereof was used as a thickness. A thickness meter manufactured by Ozaki Mfg. Co., Ltd. was used.

(Procedures)

(1) At the stage when a sample was loaded, an initial loss of pressure (Pa) (hereinafter, also referred to as pressure loss) possessed by a sample felt was measured in a dustless state.

(2) First step: Dust shaking-off is carried out when pressure loss reached 1000 Pa. This operation was repeated 30 times. In these operations, residual pressure loss (Pa) and concentration in exhaust air (mg/m³) immediate after the dust shaking-off were measured.

(3) Second step: As the aging treatment, dust shaking-off was repeated 5000 times at 5 seconds intervals.

(4) Third step: As the stabilization operation, dust shaking-off operation was carried out 10 times in a state where pressure loss was 1000 Pa.

(5) Fourth step: Dust shaking-off operation was carried out 30 times in a state where pressure loss was 1000 Pa. In these operations, residual pressure loss (Pa) and concentration in exhaust air (mg/m³) were measured.

[Difficulty in Clogging]

Using the test results in the fourth step, difficulty in clogging was judged from the relationship between number of dust shaking-off and interval of the dust shaking-off. Longer dust shaking-off interval means more superior clogging performance.

[Dust Shaking-Off Performance]

Using the test results in the fourth step, dust shaking-off performance was judged from the relationship between number of dust shaking-off and residual pressure loss. Lower residual pressure loss means more superior dust shaking-off performance.

Example 1

A filament nonwoven fabric having a weight of 230 g/m² configured with a polyethylene terephthalate fiber having a birefringence of 0.04 and an average fiber diameter of 17.6 μm made by a known spun-bonding method on a filtration layer of a filter cloth, a woven fabric having a weight of 70 g/m² made of a spun yarn of polyethylene terephthalate fiber of single yarn count 10× one strand as a support layer, and a fiber web having a weight of 200 g/m² made by a known carding method with polyethylene terephthalate staple fiber having a birefringence of 0.13, an average fiber diameter of 14.3 μm, a cut length of 51 mm, and crimp of 5 crimps/inch as a back face filtration layer were laminated and integrated by needle-punching to obtain a laminate. Subsequently, the laminate was subjected to heat set (temperature x time: 180° C.×30 seconds), and then singeing and air permeability control by a pair of plain metal rollers (temperature: 80° C.). This laminate was processed using a concave-convex shaping equipment (manufactured by Saito Engineers Co., Ltd., "Embostar™") by a pair of concave-convex rollers having a thickness of concave-convex cylindrical plate to be used for the rollers of 3 mm, a height from hill part to trough part in concave-convex part of 4 mm, a pitch between hills (in the length direction) of 15 mm, and a thickness of spacer of 3 mm under the processing conditions of roller gap: 0.5 mm, temperature: 150° C., and processing speed: 1.2 m/min, to obtain a filter cloth having a height from hill part to trough part in the concave-convex part of 4 mm, and a convex part per unit area of 117 pieces/100 cm² on the filtration surface. Characteristics of the obtained filter cloth and measurement results of filtration performances are shown in Table 1-1 below.

Example 2

Fiber webs having a weight of 210 g/m² made with a polyethylene terephthalate staple fiber having a birefringence of 0.13, an average fiber diameter of 14.3 μ a cut length of 51 mm, crimp of 5 crimps/inch, and a weight of 210 g/m² on upper and lower filtration layers of a filter cloth by a known carding method, and a woven fabric having a weight of 80 g/m² made of a spun yarn of polyethylene terephthalate fiber of single yarn count 20×two strands and weaving density of 18 yarns/inch (warp)×16 yarns/inch (weft) as a support layer were laminated and integrated by needle-punching, to obtain a laminate. Subsequently, the laminate was subjected to heat set (temperature x time: 200° C.×30 seconds), and then singeing and air permeability control by a pair of plain metal rollers. This laminate was processed using an embossing equipment which was constructed of an engraved roller of diamond shaped concave-convex patterns having a height of 2.0 mm and pitches of 6.0 mm (length)×5.0 mm (breadth) for one face and a paper roller for another face at 180° C., to obtain a filter cloth having a height from hill part to trough part in the concave-convex part of 2 mm, and a convex part per unit area of 1368 pieces/100 cm² on the filtration surface. Characteristics of the obtained filter cloth and measurement results of filtration performances are shown in Table 1-1 below.

Example 3

A laminate having the same configuration and subjected to the same processing as in Example 1 was processed using a pair of concave-convex rollers having a height from hill part to trough part of 16 mm and a pitch between hills (in the length direction) of 24 mm under conditions of a roller gap of 0.5 mm and a temperature of 150° C., to obtain a filter cloth having a height in concave-convex part of 16 mm and a convex part per unit area of 72 pieces/100 cm² on the filtration surface. Characteristics of the obtained filter cloth and measurement results of filtration performances are shown in Table 1-1 below.

Example 4

A filament nonwoven fabric having a weight of 200 g/m² configured with a polyphenylene sulfide fiber having a birefringence of 0.04 and an average fiber diameter of 14.5 μm made by a known spun-bonding method as a filtration layer of a filter cloth, a woven fabric having a weight of 100 g/m² made of a polyphenylene sulfide multifilament yarn of 225 denier and 60 filaments as a support layer, and a web having a weight of 200 g/m² made by a known carding method configured with polyphenylene sulfide staple fiber having an average fiber diameter of 14.5 μm and a cut length of 51 mm as a back face filtration layer were laminated and integrated by needle-punching to obtain a laminate. Subsequently, the laminate was subjected to heat calendaring treatment by a pair of plain metal rollers at 230° C. and then singeing, as well as air permeability control by a pair of plain metal rollers. This laminate was processed using a concave-convex shaping equipment (manufactured by Saito Engineers Co., Ltd., "Embostar™") by a pair of concave-convex rollers having a thickness of concave-convex cylindrical plate to be used for the rollers of 3 mm, a height from hill part to trough part in concave-convex part of 4 mm, a pitch between hills (in the length direction) of 15 mm, and a thickness of spacer of 3 mm under the processing conditions of roller gap: 0.5 mm, temperature: 220° C., and processing speed: 1.2 m/min, to obtain a filter cloth having a height from hill part to trough part in the concave-convex part of 4 mm, and a convex parts per unit area of 96 pieces/100 cm² on the filtration surface. Characteristics of the obtained filter cloth and measurement results of filtration performances are shown in Table 1-1 below.

Example 5

A laminate having the same configuration and subjected to the same processing as in Example 4 was processed using a pair of concave-convex rollers having a height from hill part to trough part in the concave-convex part of 20 mm and a pitch between hill and hill (in the length direction) of 30 mm under conditions of a roller gap of 0.5 mm and a temperature of 220° C., to obtain a filter cloth having a height from hill part to trough part in the concave-convex part of 20 mm and a convex part per unit area of 80 pieces/100 cm² on the filtration surface.

Subsequently, the filter cloth was added with an epoxy resin in an addition amount of 10 g/m² by spraying method, then dried and subjected to heat set (180° C.×3 minutes), to obtain a filter cloth having a concave-convex height of 20.0 mm. Characteristics of the obtained filter cloth and measurement results of filtration performances are shown in Table 1-1 below.

Example 6

A filament nonwoven fabric having a weight of 200 g/m² configured with a polyphenylene sulfide fiber having a birefringence of 0.08 and an average fiber diameter of 11.5 μm made by a known spun-bonding method as a filtration layer of a filter cloth, a woven fabric having a weight of 78 g/m² made of a polyphenylene sulfide multifilament yarn of 225 denier, and a weaving density of 20 yarns/inch (warp)×18 yarns/inch (weft) as a support layer, and a web having a weight of 200 g/m² made by a known carding method configured with polyphenylene sulfide staple fiber having an average fiber diameter of 14.5 μm and a cut length of 51 mm as a back face filtration layer were laminated and integrated by needle-punching to obtain a laminate. Subsequently, the laminate was subjected to heat calendaring treatment by a pair of plain metal rollers at 200° C. and then singeing, as well as air permeability control by a pair of plain metal rollers (temperature: 210° C.). This laminate was processed using a concave-convex shaping equipment (manufactured by Saito Engineers Co., Ltd., "Embostar™") by a pair of concave-convex rollers having a thickness of concave-convex cylindrical plate to be used for the rollers of 3 mm, a height from hill part to trough part in the concave-convex part of 4 mm, a pitch between hills (in the length direction) of 15 mm, and a thickness of spacer of 3 mm under the processing conditions of roller gap: 0.5 mm, temperature: 240° C., and processing speed: 1.2 m/min, to obtain a filter cloth having a height in the concave-convex part of 3.2 mm, and a convex part per unit area of 96 pieces/100 cm² on the filtration surface. Characteristics of the obtained filter cloth and measurement results of filtration performances at room temperature and 190° C. simulating for practical usage environment are shown in Table 1-1 below.

Example 7

A filter cloth was obtained in the same way as in Example 6, except that a filament nonwoven fabric having a weight of 200 g/m² made of a polyphenylene sulfide fiber having a birefringence of 0.04 and an average fiber diameter of 14.5 μm was used as a filtration layer of the filter cloth in the above-described Example 6. Characteristics of the obtained filter cloth and measurement results of filtration performances at room temperature and 190° C. simulating for practical usage environment are shown in Table 1-1 below.

Comparative Example 1

Fiber webs having a weight of 210 g/m² made by a known carding method with polyethylene terephthalate staple fiber having a birefringence of 0.13, an average fiber diameter of 14.3 μm, a cut length of 51 mm, and crimp of 5 crimps/inch as upper and lower filtration layers of a filter cloth, and a woven fabric having a weight of 80 g/m² made of a spun yarn of polyethylene terephthalate fiber of single yarn count 20 S×2 as a support layer were laminated and integrated by needle-punching, to obtain a laminate. Subsequently, the laminate was subjected to singeing and air permeability control by a pair of plain metal rollers, but not subjected to concave-convex processing, to obtain a filter cloth. Characteristics of the obtained filter cloth and measurement results of filtration performances are shown in Table 1-2 below.

Comparative Example 2

A filament nonwoven fabric having a weight of 230 g/m² configured with a polyethylene terephthalate fiber having a birefringence of 0.04 and an average fiber diameter of 17.6 μm made by a known spun-bonding method as a filtration layer of a filter cloth, a woven fabric having a weight of 70 g/m² made of a spun yarn of polyethylene terephthalate fiber of single yarn count 20 S×2 as a support layer, and a fiber web having a weight of 200 g/m² made by a known carding method configured with polyethylene terephthalate staple fiber having a birefringence of 0.13, an average fiber diameter of 14.3 μm, a cut length of 51 mm, and crimp of 5 crimps/inch as a back face were laminated and integrated by needle-punching to obtain a laminate. Subsequently, the laminate was subjected to heat set (temperature×time: 180° C.×30 seconds) and then singeing, as well as air permeability control by a pair of plain metal rollers. This laminate was processed using an embossing equipment by embossing rollers combined with a pinpoint type concave-convex engraved pattern roller having pitches of 3.0 mm (length)×2.5 mm (breadth) and a height of 1.5 mm for one face and a paper roller for another face at a temperature of 230° C., to obtain a filter cloth having a height in the concave-convex part of 1.5 mm. Characteristics of the obtained filter cloth and measurement results of filtration performances are shown in Table 1-2 below.

Comparative Example 3

A filament nonwoven fabric having a weight of 250 g/m² configured with a polyethylene terephthalate fiber having a birefringence of 0.13 and an average fiber diameter of 14.3 μm was obtained by a known spun-boding method, and then subjected to a usual embossing processing with a height of 0.6 mm. This was a filter cloth which was made without being laminated with a woven fabric layer and without being subjected to the concave-convex processing relevant to the present invention, although subjected to a usual embossing processing. Characteristics of the obtained filter cloth and measurement results of filtration performances are shown in Table 1-2 below. The filter cloth showed insufficient filtration performances as well as weak strength.

Comparative Example 4

Fiber webs having a weight of 210 g/m² made by a known carding method with polyphenylene sulfide staple fiber having birefringence of 0.11, average fiber diameter of 14.3 μm, a cut length of 51 mm, and crimp of 5 crimps/inch as upper and lower filtration layers of a filter cloth, and a woven fabric having a weight of 80 g/m² made of a spun yarn of polyphenylene sulfide fiber of single yarn count 20 S×2 as a support layer were laminated and integrated by known needle-punching, to obtain a laminate. Subsequently, the laminate was subjected to singeing and air permeability control by a pair of plain metal rollers but not to concave-convex processing, to obtain a filter cloth. Characteristics of the obtained filter cloth and measurement results of filtration performances are shown in Table 1-2 below. Comparative Example 4 is an example of a case using a PPS felt which was not subjected to concave-convex processing instead of the PET felt in Comparative Example 1.

TABLE 1-1

| | | Example 1 | Example 2 | Example 3 | Example 4 | Example 5 | Example 6 | | Example 7 | |
|---|---|---|---|---|---|---|---|---|---|---|
| Characteristics of filtration cloth | Height of concave-convex (mm) | 4 | 2 | 16 | 4 | 20 | 3.2 | | 3.2 | |
| | Number of any of concave, convex or concave-convex region per unit area (piece/100 cm²) | 117 | 1368 | 72 | 96 | 80 | 96 | | 96 | |
| | Weight per unit area (g/m²) | 500 | 500 | 500 | 500 | 510 | 500 | | 500 | |
| | Thickness (mm) | 1.85 | 1.62 | 2.00 | 1.80 | 2.10 | 1.53 | | 1.53 | |
| | Air permeability (cc/cm²/sec) | 22.7 | 16.8 | 34.5 | 23 | 37.8 | 22.2 | | 15 | |
| | Thickness before concave-convex processing (mm) | 2.26 | 1.84 | 2.95 | 2.20 | 2.84 | 1.80 | | 1.80 | |
| Filtration performance | Measurement temperature (° C.) | Room temp. | Room temp. | Room temp. | Room temp. | Room temp. | Room temp. | 190 | Room temp. | 190 |
| | Initial Pressure loss (Pa) | 13.7 | 24.4 | 9.7 | 14.5 | 8.8 | 21 | 28 | 33 | 45 |
| | First step Residual pressure loss (Pa) | 40.6 | 52.1 | 48.4 | 42 | 53.3 | 38 | 51 | 42 | 65 |
| | Exhaust concentration (mg/m³) | 0.607 | 0.516 | 0.707 | 0.589 | 0.783 | 0.3 | 0.32 | 0.34 | 1.03 |
| | Fourth step Residual pressure loss (Pa) | 118.8 | 199.1 | 176.2 | 130.2 | 193.4 | 101 | 122 | 126 | 140 |
| | Exhaust concentration (mg/m³) | 0.037 | 0.014 | 0.037 | 0.008 | 0.045 | 0.16 | 0.21 | 0.05 | 0.32 |

TABLE 1-2

|  |  | Comparative Example 1 | Comparative Example 2 | Comparative Example 3 | Comparative Example 4 | |
|---|---|---|---|---|---|---|
| Characteristics of filtration cloth | Height of concave-convex (mm) | — | 1.5 | 0.6 | — | |
|  | Number of any of concave, convex or concave-convex region per unit area (piece/100 cm²) | — | 5440 | 570 | — | |
|  | Weight per unit area (g/m²) | 500 | 500 | 250 | 500 | |
|  | Thickness (mm) | 1.37 | 1.40 | — | 2.00 | |
|  | Air permeability (cc/cm²/sec) | 13.1 | 12.5 | 10 | 12.5 | |
|  | Thickness before concave-convex processing (mm) | — | 1.55 | 0.60 | — | |
| Filtration performance | Measurement temperature (° C.) | Room temp. | Room temp. | Room temp. | Room temp. | 190 |
|  | Initial Pressure loss (Pa) | 30.8 | 38 | 35.4 | 38 | 52 |
|  | First step Residual pressure loss (Pa) | 87 | 95 | 115 | 55 | 74 |
|  | Exhaust concentration (mg/m³) | 0.571 | 0.48 | 0.655 | 0.78 | 1.07 |
|  | Fourth step Residual pressure loss (Pa) | 253.1 | 303.7 | 354.2 | 218 | 288 |
|  | Exhaust concentration (mg/m³) | 0.014 | 0.046 | 0.032 | 0.086 | 0.137 |

Figure 5:
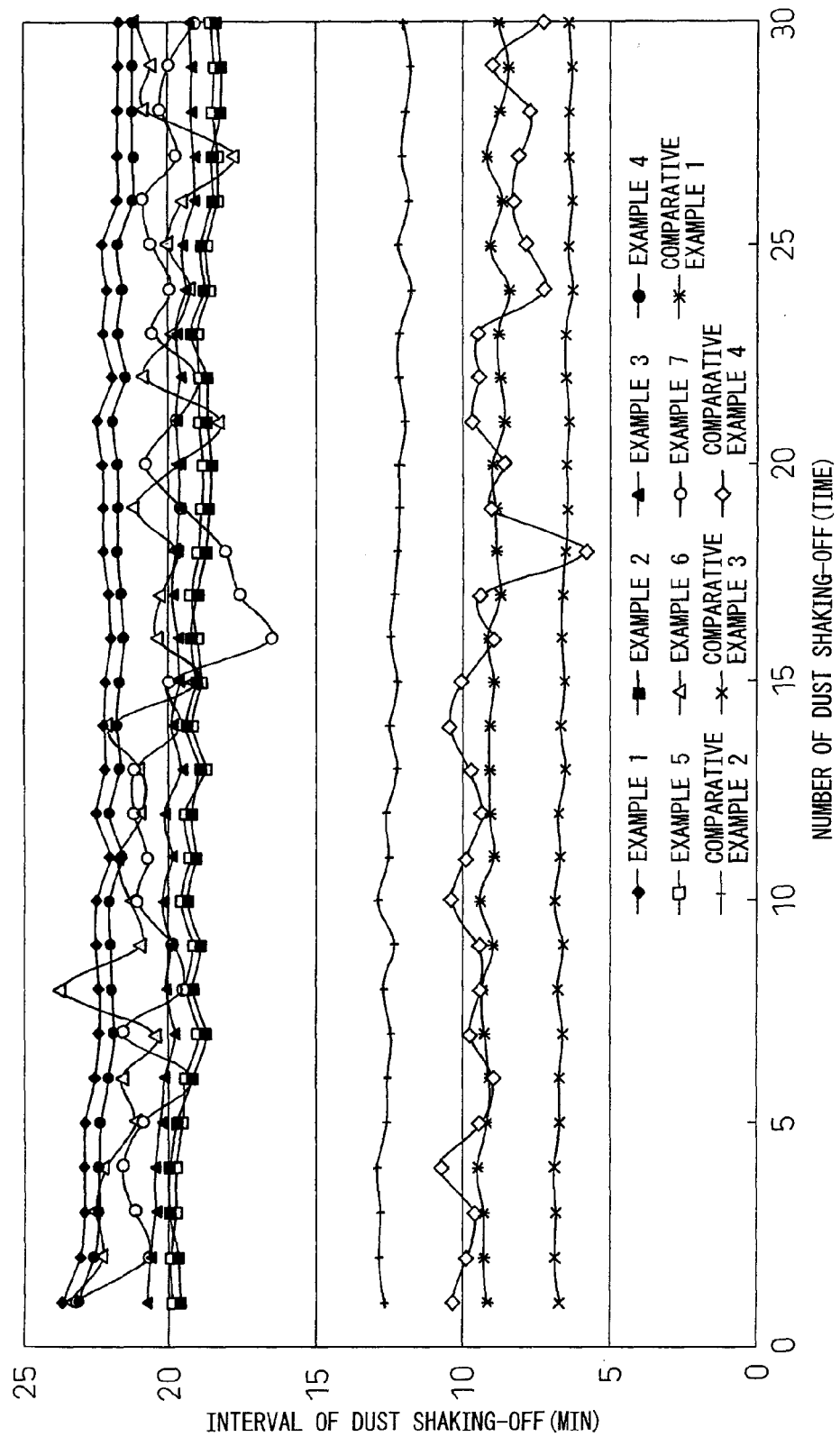
FIG. 5 is graphs showing intervals of dust shaking-off and numbers of dust shaking-off operation in Examples 1 to 7 and Comparative Examples 1 to 4.
Figure 6:
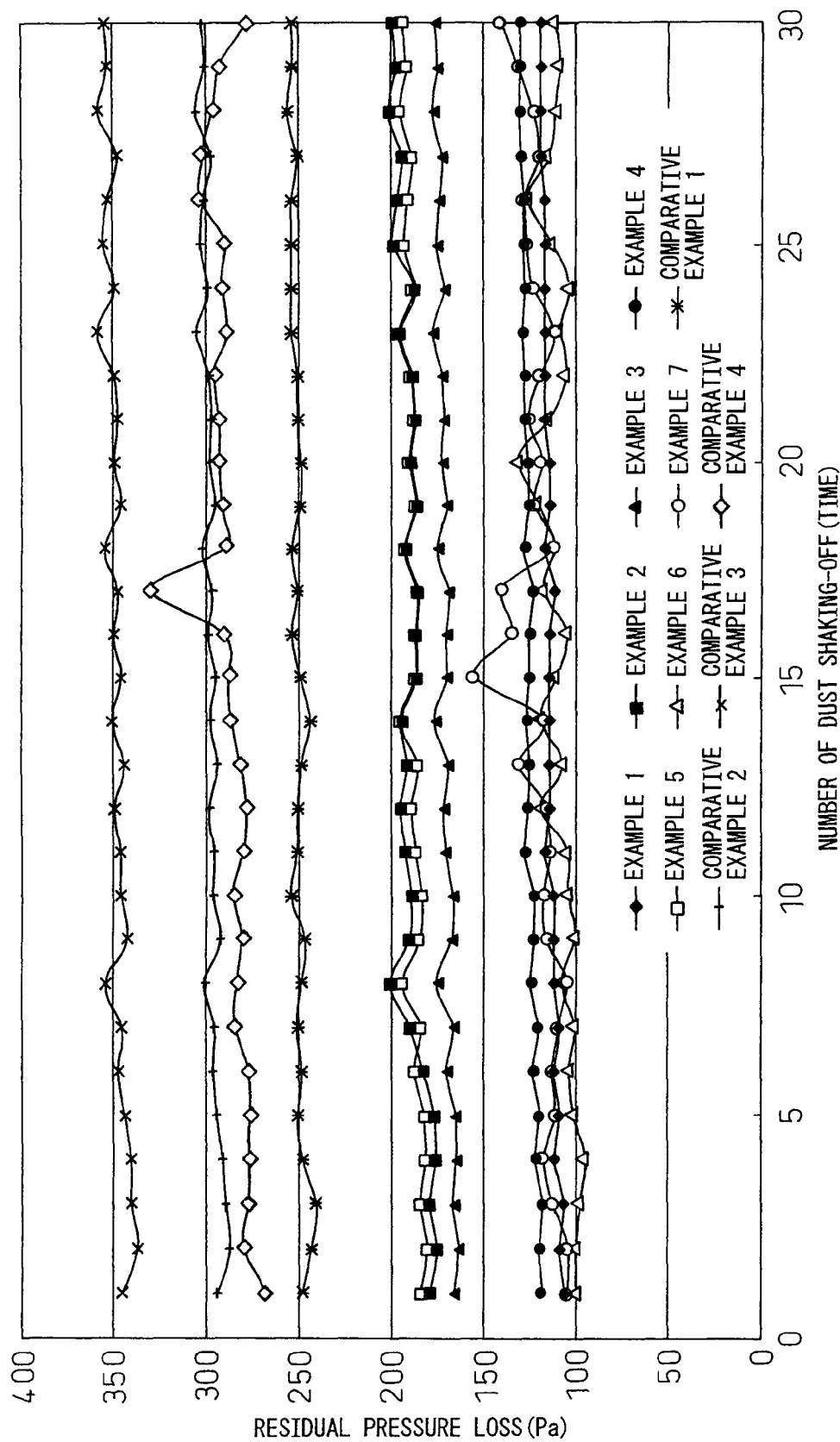
FIG. 6 is graphs showing residual pressure losses of the filter cloth after dust shaking-off and numbers of dust shaking-off operation in Examples 1 to 7 and Comparative Examples 1 to 4.

From Table 1, FIG. 5 and FIG. 6, it is obvious that the filter cloths having concave-convex shapes on the surfaces thereof (Examples 1 to 7) express high filtration characteristics such as low pressure loss, minimal clogging, and superior dust shaking-off performance compared with those of the conventional filter cloths (Comparative Examples 1 to 4).

Industrial Applicability

The filter cloth for a dust collector relevant to the present invention has filtration performances showing minimal dust clogging, superior dust shaking-off performance, low pressure loss, and long life, without impairing collection performance even under such dust collection conditions as high speed filtration and high dust concentration, and therefore does not limit size of a dust collector where a bag filter is used and can be used widely for various types of dust collectors.

| DESCRIPTION OF LEGENDS | |
|---|---|
| 1: | Concave part |
| 2: | Convex part |
| 3: | Nonwoven fabric layer on the surface of filter cloth |
| 3': | Nonwoven fabric layer on the back face of filter cloth |
| 4: | Support layer of filter cloth |
| 5: | Melted and fused part on the surface of filter cloth |
| 6: | Dense part on the surface of filter cloth |
| 7: | Course part on the surface of filter cloth |
| A: | Hill part |
| B: | Trough part |
| E: | Height from a hill part to a trough part (height of concave-convex part) |
| a-b: | Breadth (lateral) direction |
| c-d: | Length direction |

The invention claimed is:

1. A filter cloth for dust collector made by laminating and integrating a filtration layer of a nonwoven fabric layer consisting of a thermoplastic fiber and a support layer of a woven fabric layer, characterized in that at least filtration surface layer of said laminated and integrated filter cloth has a concave-convex shape having a height from hill part to trough part of 1.6 to 20.0 mm, and a fused part by melting, a non-fused part, a dense part by crushing, and a coarse part by extension are present together on the surface layer of the filter cloth.

2. The filter cloth for dust collector according to claim 1, wherein said dense part by crushing and said coarse part by extension have been made by concave-convex shaping processing using at least one concave-convex shaping equipment selected from the group consisting of a pair of concave-convex rollers; an embossing equipment; a flat press equipment; and a cylinder type press equipment.

3. The filter cloth for dust collector according to claim 1 or 2, wherein the number per unit area of any one of concave part, convex part and concave-convex part is 10 to 5000/100 cm².

4. The filter cloth for a dust collector according to claim 1 or 2, wherein the filter cloth has been provided with a resin binder.

5. The filter cloth for a dust collector according to claim 1 or 2, wherein the filter cloth has an air permeability of 1 to 100 cc/cm²/sec.

6. The filter cloth for a dust collector according to claim 1 or 2, wherein the filtration layer of the nonwoven fabric layer consists of any one of staple fiber nonwoven fabric, filament nonwoven fabric or fiber web which has a fiber diameter of 0.1 to 100 μm and a weight of 100 to 900 g/m².

7. The filter cloth for a dust collector according to claim 1 or 2, wherein the support layer of the woven fabric layer is a woven fabric consisting of any one of multifilament, monofilament or spun yarn.

8. The filter cloth for a dust collector according to claim 1 or 2, wherein the thermoplastic fiber of the filtration layer is made by laminating or blending a polyester fiber having a birefringence of 0.06 or less.

9. The filter cloth for a dust collector according to claim 1 or 2, wherein the thermoplastic fiber of the filtration layer is made by laminating or blending a polyphenylene sulfide fiber having a birefringence of 0.08 or less.

10. The filter cloth for a dust collector according to claim 6, wherein the filtration layer of the nonwoven fabric layer consists of any one of filament nonwoven fabric or fiber web.

* * * * *